March 14, 1961 E. F. KUPS 2,975,404
ERROR-DETECTING CIRCUIT FOR PULSE STORAGE SYSTEMS
Filed Feb. 26, 1958 3 Sheets-Sheet 1

INVENTOR.
EDWARD F. KUPS
BY
ATTORNEYS

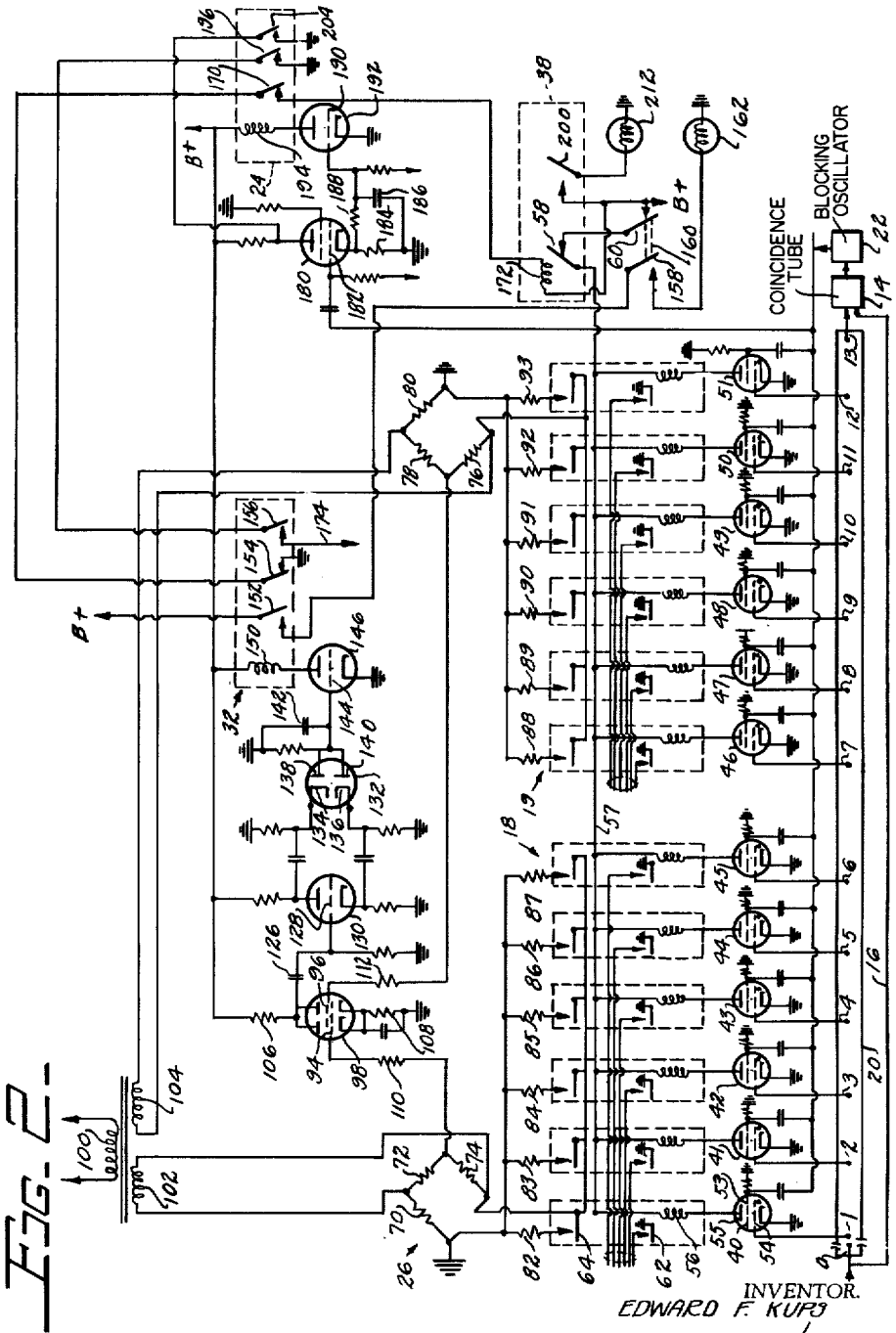

March 14, 1961 E. F. KUPS 2,975,404
ERROR-DETECTING CIRCUIT FOR PULSE STORAGE SYSTEMS
Filed Feb. 26, 1958 3 Sheets-Sheet 3
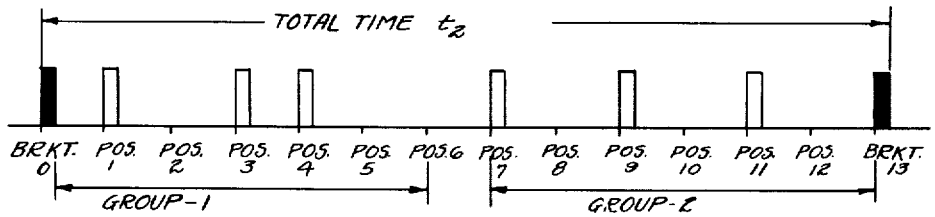
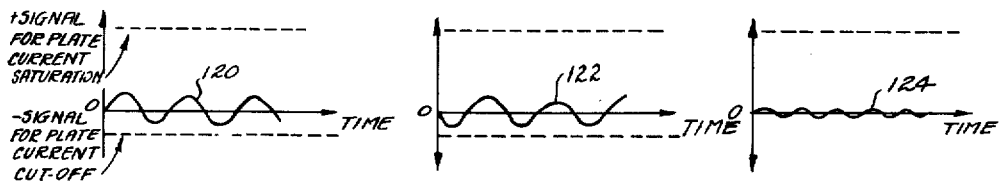
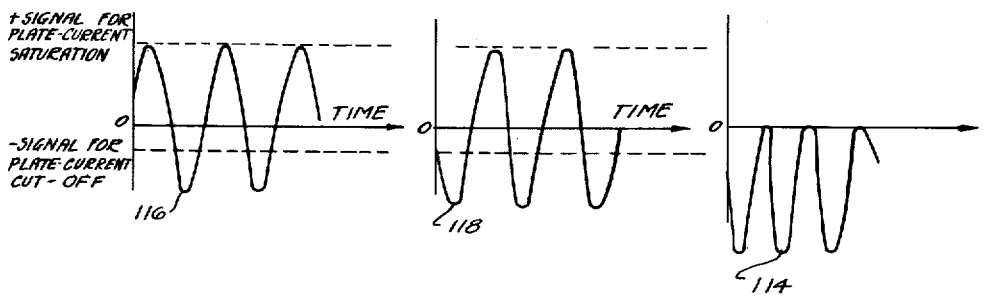
INVENTOR.
EDWAD F. KUPS
BY
S. A. Strickler
ATTORNEYS

United States Patent Office 2,975,404
Patented Mar. 14, 1961

2,975,404

ERROR-DETECTING CIRCUIT FOR PULSE STORAGE SYSTEMS

Edward Frank Kups, Los Angeles, Calif., assignor to the United States of America as represented by the Secretary of the Air Force Filed Feb. 26, 1958, Ser. No. 717,793

9 Claims. (Cl. 340—164)

(Granted under Title 35, U.S. Code (1952), sec. 266)

The invention described herein may be manufactured and used by or for the United States Government for governmental purposes without payment to me of any royalty thereon.

This invention relates to an error-detecting circuit for pulse storage systems and particularly to pulse circuits which use error-detection pulse codes to insure that the information received in a pulse sequence is exactly the same as transmitted.

In radar beacon and related systems where noise bursts or jamming signals result in pulses being added, or subtracted from the original sequence of pulses, information may be received in a single pulse group, stored in sequence in some device such as thyratrons and checked for errors with this invention before being fed to data processing or display equipment.

This invention is used to determine if the pulse group sent by the transmitter contains the correct number of pulses and also checks for their proper grouping in the pulse train. If the received signal is correct, the information is registered on a set of registers.

If the received pulse train does not contain the correct number of pulses and grouping, the circuit comprising this invention flashes a red light to indicate that the incoming signal is not correct. The circuit also "erases" the signal stored in the thyratron memory device and resets the circuit to initial start conditions. If the received signal is correct the circuit in this invention retains the information stored in the memory circuit and supplies an electrical connection to the display indicator circuits, thus activating them.

This invention permits checking the accuracy of information received from pulse sequences which utilize an error-detection-code arrangement of pulses. In these pulse systems information is transmitted using the same number of pulses but varying the time spacing between them. The information pulses are located between two bracketing pulses whose spacing is fixed. This invention checks the stored pulse information for the total quantity of pulses and their grouping.

The error-detection code used with this invention requires that for each different quantity of information transmitted the total number of pulses be the same but that the time-spacing between pulses be different.

In a construction according to the invention a delay line has a plurality of groups of pulse storage devices connected thereto, a coincidence trigger operative to store the pulses on the line, means to compare the stored pulses for errors and detecting means operable to either transmit or discard the stored information carried by the pulses.

It is accordingly an object of this invention to provide an improved error detecting system.

It is a further object to provide a reliable comparison system.

It is another object to provide a system responsive to error detection to discharge stored error containing information.

Other objects and advantages of the invention will be apparent from the following description taken in conjunction with the accompanying drawing in which:

Figure 2 is a circuit diagram of a construction according to the invention;

Figure 3 is a schematic diagram of a typical code sequence for use in the system;

Figure 4 is a graphical indication of the in and out signal of the detector for a correct signal; and Figure 5 is a similar presentation of the in and out signal for an incorrect signal.

Figure 1:
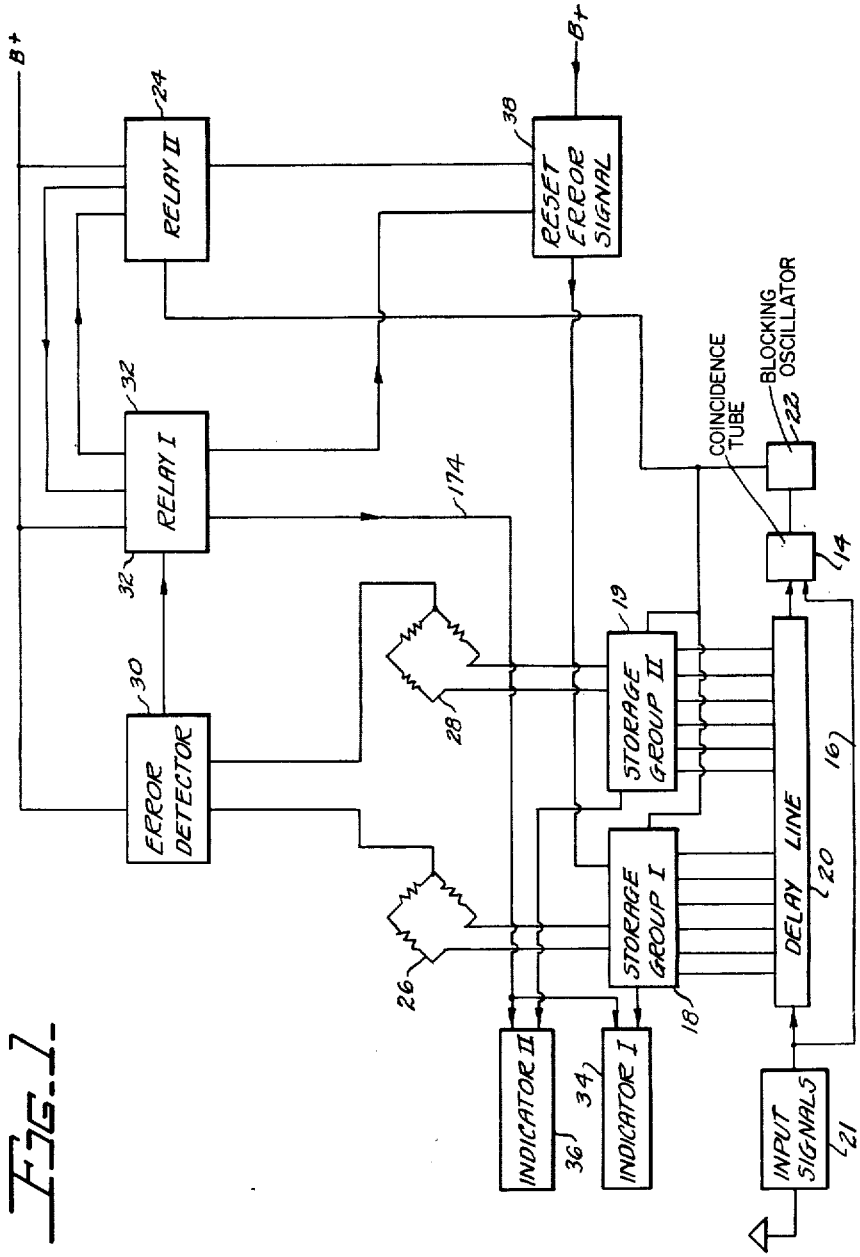
Figure 1 is a block diagram of a system according to the invention.

In an exemplary embodiment according to the invention a source of input signals such as a receiver 21 is connected to a delay line 20 and to a coincidence tube 14 by a bypass 16. A first group 18 and a second group 19 of signal storage devices are connected intermediate the ends of the delay line 20. On proper signal coincidence tube 14 causes blocking oscillator 22 to send a control pulse to storage groups 18 and 19 and to intermediate relay 24.

The condition in group 18 controls the signal output of bridge 26 and group 19 controls bridge 28. The output signals of bridges 26 and 28 are applied to the error detector 30 which controls relay 32 which cooperates with relay 24 to provide either an error signal and reset the system or to feed the stored information to indicators 34 and 36 of any desired type.

Delay line 20 is provided with taps 0–13 with tap 0 connected to coincidence tube 14 through bypass 16 and tap 13 directly connected to tube 14. Taps 1 to 6 inclusive are connected to storage group 18 and taps 7 to 12 inclusive are connected to storage group 19.

The desired characteristics of the pulse-coded signal will be determinative of the characteristics of the delay line 20. The total delay of the delay line must be equal to the time interval between the initial bracket pulse and the ending bracket pulse. The several taps on the line are spaced in accordance with the code characteristics, which may, for example, have six equal time intervals followed by a somewhat longer interval and six equal time intervals. The latter six time intervals may be equal to the first six intervals.

The storage groups 18 and 19 are identical and each consists of six thyratron tubes, group 18 containing tubes 40 to 45 and group 19 contains tubes 46 to 51. Each of the tubes 40 to 51 inclusive is provided with a shield grid 53 controlled by oscillator 22. Also each tube 40 to 51 is provided with a control grid 54. The control grids 54 are connected to the taps 1 to 12 of delay line 20. Tubes 40 to 45 have their control grids 54 connected to taps 1 to 6 and tubes 46 to 51 have their contact grids 54 connected to taps 7 to 12. The plates 55 of each of tubes 40 to 51 are connected through switch operating coils 56 to conductor 57 which is connected through normally closed switches 52 and 60 to the B+ supply. Each operating coil 56 controls an indicator switch 62 and a null detector switch 64.

The thyratron tubes 40–51 are of the pentode type which have two control grids. The normal bias on the second control grid or screen grid 53 is sufficiently negative to prevent conduction when a pulse is applied to its first control grid from the delay line 20. However, operation of the blocking oscillator 22 produces a pulse which is applied to the second control grids of the several thyratron tubes 40–51, making them during the duration of the pulse, sufficiently positive to allow a pulse applied to the first control grid to ionize the tube.

As is well known in the art, a thyratron tube may be ionized by pulses of very short duration, even as short as a micro-second. Once it is ionized, the tube will remain conductive, without regard to the voltages on its grids, until it is extinguished by reducing the current through the tube to the required extent. Electromagnetic relays, on the other hand, require much periods of energization in order to actuate their contacts. The thyratron tubes 40–51 therefore serve to store the occurrence of a coincidence between a pulse from the blocking oscillator 22 and a pulse from the delay line 20 for a sufficient time interval to allow the relays in the tube circuit and the indicators to be actuated.

The null-detection circuit consists of two bridges 26 and 28 which become balanced when the resistors in each arm are equal. Referring to the schematic diagram, fixed bridge resistors 70, 72, 74 and 76, 78 and 80 are all of equal resistance values. The bridge variable arm resistors 82 through 93 are each three times the resistance value of the fixed bridge resistors 70 through 80. Thus when any tubes of a group "fire," the contacts 64 of the corresponding plate circuit relays are closed and thereby place the variable-arm resistors of the groups in parallel and when 3 and only three tubes of a group fires result in the bridge being balanced. When balance occurs for both bridges 26 and 28, the signal on grids 94 and 96 of tube 98 drops to a low value. Almost zero-signal at balance could be obtained if precision one-percent tolerance resistors were used for the fixed and variable arms of the bridge. However this is not required because of the special null-signal cancelling feature designed into the circuit which permits any five-percent tolerance resistor to be used for the bridge resistors.

The bridges 26 and 28 are supplied with a suitable, potential from transformer 100, such as 40 volts, 60 c.p.s. The secondaries 102 and 104 of transformer 100 are poled so that the pulses fed to each bridge have a phase difference of 180 degrees. Thus the bridge signals on grids 94 and 96 of 98 are 180 degrees out of phase. Tube 98 is a double triode with a common plate load resistor 106 and self biasing resistor 108 set to a large enough value to place the operating bias of tube 98 near cut-off. Resistors 110 and 112 are used to limit the current drawn by the grids 94 and 96 on large input signal levels as exist when the bridge is completely unbalanced. Figure 5 shows the output of tube 98 with both bridges 26 and 28 unbalanced. A large amplified output signal 114 exists on the plate load resistor 106 even when the signals 116 and 118 on the grids 94 and 96 of tube 98 are equal and opposing each other. This condition exists because the tube 98 is operating near cut-off. Thus as the signal goes positive on one grid it produces a negative output in the plate load. Simultaneously the signal on the second grid goes negative resulting in a slight positive output in the plate load because of the tube operating near cut-off. The resultant signal 114 is therefore a large negative value. As shown in Figure 4, at null balance of both bridges the grid signals 120 and 122 are greatly reduced and the amplification of positive and negative values of grid signal are about equal, thereby resulting in an almost perfect cancelling effect in the plate load resistor 106 to produce substantially zero signal 124.

The signal output from tube 98 is coupled through condenser 126 to the grid 128 of 130 which serves as a phase splitting or paraphase tube to permit full-wave rectification of the signals. The signal from 130, consisting of two similar signals 180 degrees out of phase with each other, are impressed on the cathodes 134 and 136 of rectifier tube 132. The rectifier tube 132 operates as a full wave rectifier to produce a negative direct-current voltage on plates 138 and 140 of 132. Condenser 142 serves as a filter condenser. This negative voltage is then fed to the grid 144 of triode 146. Operating coil 150, relay 32, in the plate of triode 146, is therefore normally deenergized because of the negative voltage on the grid 144 of 146 preventing the flow of plate current. When the bridges 26 and 28 are balanced by a correct pulse sequence of signals, the output of 98 is essentially zero and therefore the negative voltage on the grid 144 of 146 is removed and relay 32 becomes energized due to plate current flow in the tube. The contacts 152, 154 and 156 on this relay 32 serve the following functions:

Contacts 152 are connected in series with the normally-open contacts 158 of the manual reset switch 160 and the circuit failure light 162. If a circuit failure such as a tube burn-out in 98 and 132 should occur the negative voltage applied to grid 144 of 146 would be removed and relay 32 would be permanently closed. This would result in the indicator circuit operating on incorrectly coded signals. However this condition would be determined immediately because the "circuit failure lamp 162" would light each time the manual reset switch 160 was operated.

Contacts 154 of relay 32 are connected in series with contacts 170 of relay 24 and the coil 172 of relay 38. Relay 38 serves as the thyratron reset relay by erasing the code sequence stored in the gas tubes and resetting them to initial conditions. Therefore if a correct code sequence is received, contacts 154 of 32 open and prevent relay 38 from operating when relay 24 contacts 170 close.

Contacts 156 of relay 32 are closed when this relay is energized by a correct-code sequence being received and serve to complete part of the circuit 174 to the display indicators 34 and 36. The indicator circuit, in order to display the signals stored in the thyratrons, must receive a momentary ground connection from this line 174.

The time-delay circuit thyratron 180 receives a positive pulse on grid 182 from blocking oscillator 22 whenever coincidence of the bracketing pulses occurs. This results in thyratron 180 being "fired" and a positive voltage appearing across resistor 184. This voltage is used to charge condenser 186 through resistor 188 to a positive voltage.

When the positive voltage reaches a value equal to the bias voltage on grid 190 of tube 192, relay 24 is energized due to the plate current flow through coil 194 in the plate circuit of 192. Thus the time delay between the coincidence-pulse firing tube 180 and relay 24, operating can be adjusted by varying the time constant of the charging circuit 188 and 186. It is set between ¼ to 1 second for this particular application. Switch 196 of relay 24 places the display indicators into operation if relay 32 is energized or switch 170 resets the thyratrons 40 to 51 if the received signal was in error (32 not energized). The operation is as follows:

Contacts 170 of relay 24 close and complete the circuit to the coil 172 of reset relay 38. If contacts 154 of relay 32 are closed (coil 150 not energized) the circuit is completed to ground and coil 172 of relay 38 becomes energized. This results in contacts 58 of 38 removing plate voltage from the thyratrons 40 to 51 and thereby stopping all current flow in these tubes and resetting them to initial conditions. Contacts 200 of 38 also close when the relay is energized and thereby complete the circuit to the error-code lamp 212. This lamp 212 signals that a wrong code-sequence was received and that a second attempt must be made to receive the personal identity of the aircraft.

Contacts 196 of relay 24 momentarily place a ground connection on the indicator "read-out start" circuit 174 through contacts 156 of relay 32. (Relay 32 is energized and contacts 156 closed for correct-code sequences.)

Contacts 204 of relay 24 place a ground on the plate of thyratron 180 and thereby remove voltage from this tube. This causes the thyratron to reset to initial current cut-off conditions and to remove voltage from its cathode resistor 184. This results in condenser 186 losing positive charge and the negative bias voltage on grid 190 of 192 increasing to its initial value and reducing plate current in 192 to zero. Relay 24 is deenergized and its contacts 170, 196 and 204 open. Thus the timing circuit automatically resets itself to initial conditions a short time after functioning.

The error-proof code used to operate the Personal-Identity Equipment consists of two pulse groups containing three pulses per group spaced between two fixed "bracketing" pulses located a predetermined number of microseconds apart. See Figure 3. Figure 3 shows a typical six-pulse twelve-position code which enables 400 different aircraft identities to be transmitted. Group 1 always has three pulses located somewhere in positions 1 to 6 and group 2, three pulses in positions 7 to 12. The pulses in each group can be arranged in 20 possible positions to give a total of 400 combinations for two groups. This invention can also be used with other error-detection codes, for example, 4 codes in 12 positions or 8 codes in perhaps 16 positions.

A sequence of pulses as shown in Figure 3 is fed into the input of the delay line 20. When the bracketing pulse #13 reaches tap 13 on the delay line 20 after the predetermined number of micro-seconds, equal to the time delay of the delay line, bracketing pulse #0 appears at tap 0 of the delay line 20. These two pulses are fed to coincidence tube 14, and the output pulse, which results from the simultaneous application of these signals, causes blocking oscillator 22 to operate. The positive pulse output of the blocking oscillator is fed to the shield-grid 53 of the thyratrons, 40 to 51, and thereby places these tubes in standby operation. If at this time a pulse signal appears on any of the taps 1 to 12, and therefore the thyratron grid 54, the corresponding thyratron fires and thereby records the sequence of pulses received.

When a thyratron is "fired" it conducts current without regard to its grid voltages, until it is extinguished. The relay in its plate circuit becomes energized and the normally-open contacts 62 and 64 close. The contacts 62 and 64 are connected to the indicator mechanisms 34 and 36 which convert the code recorded by the thyratrons to letters on indicator drums. The indicators 34 and 36 will operate and use this information only if the error-detecting circuit supplies a start pulse showing that the received signal has the correct sequence. If the received signal was in error due to noise bursts or other disturbances adding or subtracting pulses from the pulse group, the error-detection circuit would remove the B+ voltage from the plates of the thyratrons and thereby "erase" the stored signal.

If a correct pulse sequence is received and therefore stored, the thyratrons 40 to 51 are reset to initial start conditions by means of reset switch 160.

The bridge method of error checking permits the device to be used with various other combinations of error-detection codes. The value of the variable resistors in the bridges can be adjusted to give a balance when one or more resistors are connected into the bridge by the relays in the plate of the thyratrons.

The sensitivity of the circuit to detect a null-balance is greatly increased due to the "phase-cancelling" arrangement of signals from the bridges at balance. This permits use of standard five-percent tolerance resistors for the bridge values.

The operation of the device is as follows: At the beginning of the operation, the thyratrons in the storage units 18 and 19 the time delay tube 180 are extinguished, and, since the contacts 64 are open, the bridges 26 and 28 are unbalanced. The tube 146 is therefore cut off, and the relay 32 is de-energized.

A series of pulses is impressed on the delay line 20, and these pulses progress along the delay line toward its remote end. As each pulse passes a tap on the delay line, there is produced a pulse which is impressed on the corresponding first control grid of the associated thyratron. However, none of the thyratrons will become conductive until screen or scond control grid 53 is made positive by a pulse from the blocking oscillator 22. The same series of pulses is impressed on the coincidence detector 14 by the lead 16, but that circuit is similarly not actuated until it receives simultaneous pulses on its two inputs.

If the bracket pulses are correctly spaced, the coincidence detector 14 will receive the first pulse of the series, as delayed by the delay line 20, at the same time it receives the last pulse of the series over wire 16. It therefore actuates the blocking oscillator 22 to render the screen grids 53 of the thyratrons more positive for a short instance of time.

If there is a pulse impressed on the control grid 54 of any of the thyratrons 40–51 from the delay line 20 at the time the pulse is applied to the screen grid by the blocking oscillator 22, that thyratron will be ionized. The relay in its plate circuit will thus be actuated. In the example given, three relays in the storage device 18 and three relays in storage device 19 should be so actuated by a correct series of pulses. If three tubes in each circuit are thus ionized, the bridges 26 and 28 become balanced, and the relay 32 is actuated.

The time delay tube 180 is also ionized by the blocking oscillator 22 and the relay 24 is closed after a short time by tube 192. If, as stated before, the correct number of thyratrons 40–51 are ionized, the relay 32 is also closed, so that the energization circuit of relay 38 is opened at contacts 154 of relay 32. The lead 174 connected to the indicators is grounded through contacts 196 of relay 24 and contacts 156 of relay 32, and the indicator thus records the identification of the aircraft. The operator may clear the current, when he is ready, by actuating manual reset switch 60.

However, if the correct number of thyratrons 40–51 are not ionized, one and/or the other of bridges 26 and 28 are unbalanced and the relay 32 remains de-energized. The ground circuit of lead 174 is open at contacts 156 and the energization circuit of the relay 38 is closed by contacts 154 of relay 32 and contacts 170 of relay 24. Relay 32 opens contacts 58 to de-energize and reset thyratrons 40–51 and closes contacts 200 to fllash light 212. The thyratrons 40–51 release their relays and the circuit is again in condition to receive another sequence of pulses.

If, on the other hand, there should be a circuit failure in which the bias voltage for tube 146 is removed, the relay 32 remains actuated. To indicate this condition, the normally open contacts 158 on the manual reset switch 60 is connected in series with contacts 158 of relay 32. Thus, when the manual reset switch is actuated, the circuit failure lamp 162 is energized to indicate that the equipment is inoperative.

For purpose of exemplification a particular embodiment has been shown and described according to the best present understanding thereof. However, it will be apparent to those skilled in the art that various changes and modifications in the construction and arrangement of the parts thereof can be resorted to without departing from the true spirit and scope of the invention.

I claim:

1. An error detecting circuit comprising, a delay line, a first and a second group of pulse coincidence storage devices connected to said delay line, a coincidence tube actuated by the arrival through said delay line of a leading bracketing pulse and the arrival at the delay line of a final undelayed bracketing pulse spaced a predetermined number of pulses from said leading pulse, a pulse generator controlled by said coincidence tube, said pulse generator being operative to condition said coincidence storage devices to store the coincidences occurring between pulses from said delay line and from said pulse generator, a first bridge having its balance determined by the pulses stored in said first group, a second bridge having its balance determined by the pulses stored in said second group, a null detector controlled by the balance of said bridges, a first relay controlled by said null detector, a second relay relay controlled by said pulse generator and an indicator circuit energized by simultaneous operation of said first and second relays.

2. An error detecting circuit comprising, a delay line, a first and a second group of pulse coincidence storage devices connected to said delay line, a coincidence tube actuated by the arrival through said delay line of a leading bracketing pulse and the arrival at the delay line of a final undelayed bracketing pulse spaced a predetermined number of pulses from said leading pulse, a pulse generator controlled by coincidence tube, said pulse generator being operative to condition said coincidence storage devices to store coincidences occurring between pulses from said delay line and from said pulse generator, a first bridge having its balance determined by the pulses stored in said second group, a null detector controlled by the balance of said bridges, a first relay controlled said null detector, a second relay controlled by said pulse generator, a time delay interposed between said pulse generator and said second relay and an indicator circuit energized by simultaneous operation of said first and second relays.

3. An error detecting circuit comprising, a delay line, a first and a second group of pulse coincident storage devices connected to said delay line, a coincidence tube actuated by the arrival through said delay line of a leading bracketing pulse and the arrival at the delay line of a final undelayed bracketing pulse spaced a predetermined number of pulses from said leading pulse, a pulse generator controlled by said coincidence tube, said pulse generator being operative to condition said coincidence storage devices to store coincidences occurring between pulses from said delay line and from said pulse generator, a first bridge having its balance determined by the pulses stored in said first group, a second bridge having its balance determined by the pulses stored in said second group, a null detector controlled by the balance of said bridges, a first relay controlled by said null detector, a second relay controlled by said pulse generator, a time delay interposed between said pulse generator and said second relay, an indicator circuit energized by simultaneous operation of said first and second relays and a reset relay energized by operation of said second relay while said first relay is unenergized.

4. An error detecting system comprising, a delay line, a first and second group of grid controlled tubes, the several control grids of said tubes being connected in spaced intervals along said delay line, an input and an output for said delay line, a coincidental tube, connections from said input and output to said coincidental tube, a pulse generator controlled by said coincidental tube, a screen grid in each of said grid controlled tubes, a common connection from said pulse generator to each of said screen grids, a first relay, means responsive to the coincidences of pulses on the control and screen grid of said grid control tubes in said groups of grid controlled tubes to energize said first relay, a second relay, means responsive to operation of said pulse generator to energize said second relay, a reset relay, and circuit means controlled by predetermined operation of said first and second relays to energize said reset relay.

5. An error detecting system comprising, a delay line, a first and second group of grid controlled tubes, the several control grids of said tubes being connected in spaced intervals along said delay line, an input and an output for said delay line, a coincidental tube, connections from said input and output to said coincidental tube, a pulse generator controlled by said coincidental tube, a screen grid in each of said grid controlled tubes, a common connection from said pulse generator to each of said screen grids, a first relay, means responsive to coincidences of pulses applied to the control of screen grids of tubes in said groups of grid controlled tubes to energize said first relay, a second relay, means responsive to operation of said pulse generator to energize said second relay, an indicator circuit, switch means responsive to simultaneous operation of said first and second relays to energize said indicator circuit.

6. An error detecting system comprising, a delay line, a first and second group of grid controlled tubes, the several control grids of said tubes being connected in spaced intervals along said delay line, an input and an output for said delay line, a coincidental tube, connections from said input and output to said coincidental tube, a pulse generator controlled by said coincidental tube, a screen grid in each of said grid controlled tubes, a common connection from said pulse generator to each of said screen grids, a switch operating coil in series with each of said grid controlled tubes, a first and second switch operated by each of said switch operating coils, said grid control tubes being rendered conductive by the simultaneous application of pulses to the control and screen grids thereof, a first and second bridge circuit, a resistor corresponding to each of said grid controlled tubes, said first switch of each tube being closed by energization of the tube to connect the corresponding resistor into one of said bridge circuits, a first relay, means responsive to simultaneous balance of said bridge circuits to energize said first relay, a second relay, means responsive to operation of said pulse generator to energize said second relay, a reset relay, circuit means controlled by predetermined operation of said first and second relays to energize said reset relay.

7. An error detecting system comprising, a delay line, a first and second group of grid controlled tubes, the several control grids of said tubes being connected in spaced intervals along said delay line, an input and an output for said delay line, a coincidental tube, connections from said input and output to said coincidental tube, a pulse generator controlled by said coincidental tube, a screen grid in each of said grid controlled tubes, a common connection from said pulse generator to each of said screen grids, said grid control tubes being rendered conductive by the simultaneous application of pulses to the control and screen grids thereof, a first relay, means responsive to a predetermined number of tubes in each of said groups of grid controlled tubes to energize said first relay, a second relay, a delay circuit triggered by operation of said pulse generator to energize said second relay, a predetermined interval after the operation of said pulse generator, a reset relay, circuit means controlled by predetermined operation of said first and second relays to energize said reset relay.

8. An error detecting circuit comprising, a delay line, a first and second group of grid controlled discharge devices, the control grids of the successive discharge devices being connected to said delay line at successive spaced positions, a coincidence tube actuated by the arrival through said delay line of a leading bracketing pulse and the arrival at the delay line of a final undelayed bracketing pulse spaced a predetermined number of pulses from said leading pulse, a pulse generator controlled by said coincidence tube, said pulse generator providing a pulse to condition said discharge devices for operation by the simultaneous application of pulses from said delay line, a first bridge having its balance determined by the conducting condition of the tubes of the first group, a second bridge having its balance determined by the conducting condition of the tubes of said second group, a pair of triodes, a common lead for said triodes, a common self biasing circuit for said triodes, the grid of said first triode being connected to said first bridge, the grid of said second tube being connected to said second bridge, a first relay including an actuating coil, a grid controlled tube connected in series with said actuating coil, means responsive to substantial blocking of said triodes to determine current flow in said grid controlled tube, a second relay including a second actuating coil, a second grid controlled tube connected in series with said second actuating coil, means triggered by said pulse from said pulse generator for controlling current flow in said second grid controlled tube, a reset relay, an actuating coil for said reset relay, circuit means for energizing said actuating coil of said reset relay in dependence on the conducting condition of said first and second grid controlled tubes.

9. An error detecting circuit comprising, a delay line, a first and second group of grid controlled discharge devices, the control grids of the successive discharge devices being connected to said delay line at successive spaced positions, a coincidence tube actuated by the arrival through said delay line of a leading bracketing pulse and the arrival at the delay line of a final undelayed bracketing pulse spaced a predetermined number of pulses from said leading pulse, a pulse generator controlled by said coincidence tube, said pulse generator providing a pulse to condition said discharge devices for operation by the simultaneous application of pulses from said delay line, a first bridge having its balance determined by the conducting condition of the tubes of the first group, a second bridge having its balance determined by the conducting condition of the tubes of said second group, a pair of triodes, a common lead for said triodes, a common self biasing circuit for said triodes, the grid of said first triode being connected to said first bridge, the grid of said second tube being connected to said second bridge, a first relay including an actuating coil, a grid controlled tube connected in series with said actuating coil, means responsive to substantial blocking of said triodes to determine current flow in said grid controlled tube, a second relay including a second actuating coil, a second grid controlled tube connected in series with said second actuating coil, means triggered by said pulse from said pulse generator for controlling current flow in said second grid controlled tube, a reset relay, an actuating coil for said reset relay, circuit means for energizing said actuating coil of said reset relay in dependence on the conducting condition of said first and second grid controlled tubes, an indicator circuit, means responsive to simultaneous current conduction in said first and second grid controlled tubes to energize said read out circuit.

No references cited.